United States Patent Office 3,230,113
Patented Jan. 18, 1966

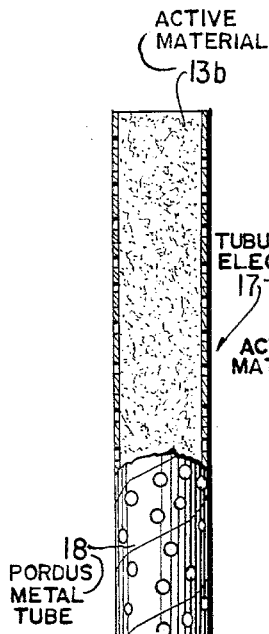
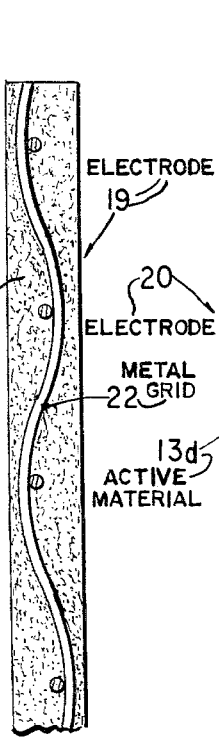
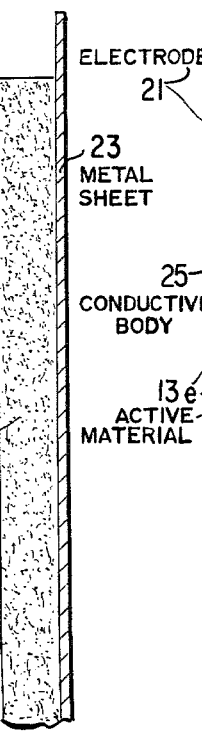
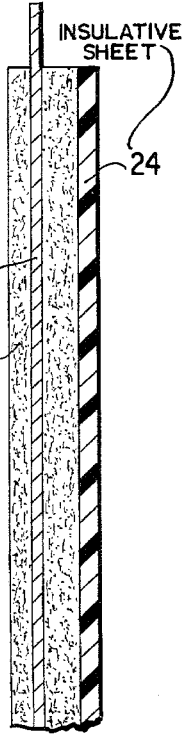
Fig. 2   Fig. 4   Fig. 5   Fig. 6
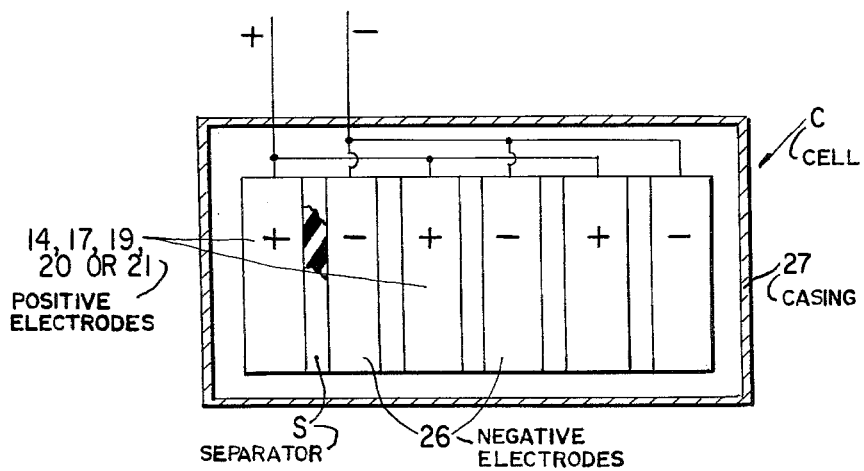
Fig. 7

3,230,113
PROCESS FOR MANUFACTURING POSITIVE ELECTRODES FOR ALKALINE STORAGE CELLS AND ALKALINE STORAGE CELLS INCLUDING SUCH POSITIVE ELECTRODES
Charles Victor Herold, Paris, France, assignor to Societe des Accumulateurs Fixes et de Traction (Societe Anonyme), Romainville, Seine, France, a company of France
Filed Mar. 6, 1962, Ser. No. 177,859
Claims priority, application France, Mar. 10, 1961, 855,253
22 Claims. (Cl. 136—28)

This invention relates to an improved process for manufacturing positive electrodes either of the tubular type or of the pocket type, or of the type where active material is mounted on a carrier for use in alkaline storage cells, to such electrodes and to alkaline storage cells embodying such positive electrodes.

As is well known, forms of positive electrodes for alkaline storage cells were developed by Edison. They are made of perforated nickel-plated tubes or pockets filled with active materials. Said active materials are non-conductive, such being the case of, e.g., nickel hydroxide, and the Edison process consists in making them conductive. The active material, as is well-known, must be made conductive in order to be used as an electrode in a storage cell; it must be able to be charged, i.e., to accede to a higher oxidation state, and able to be discharged afterwards, i.e., to be brought back to a lower state of oxidation. These processes of charge and discharge can only take place in the layers of active material, such as nickel hydroxide, which are in electrical contact with a conductive carrier, said layers having a very small depth such as a few microns. The electrochemical efficiency for charging and discharging is found to be very high if the depth of such a layer is less than or equal to about 10 microns and to be lower for a depth of 20 microns and very low for a depth of 50 microns. This is the reason why every effort has been made to incorporate a conductive material into the nickel hydroxide.

For a very long time the two following conventional processes have been in use for obtaining this result.

A tubular container, generally made by twisting a thin, finely perforated sheet of nickel-plated steel is filled by strongly compressing alternate layers of positive active material (nickel hydroxide to which may be added a given amount of cobalt hydroxide) and of nickel flakes, the latter being used as electrical conductors. The mass thus obtained is partitioned by conductive parts (the flakes) which give it some conductivity.

This solution has the main advantage of providing electrodes with a long life and a good capacity which are capable of being subjected to more than 3,000 cycles of charge and discharge which yields a time of service of at least ten years.

However, this solution has disadvantages. First, it is very costly chiefly from the fact that the manufacture of nickel flakes having a thickness of about 1 micron and an area of 1 or 2 mm.² area is very complex. But the major drawback is that the active mass is not conductive enough, so that it has a very low efficiency. The depth of the nickel hydroxide layer imprisoned between two conductive layers of nickel flakes is practically in the range of from 200 to 400 microns. This depth is at least five times higher than the acceptable depth of the elementary working layer in contact with a conductive wall, said acceptable depth being at the most 20 microns.

There is also another drawback. It is advantageous to compress very highly the several layers of nickel hydroxide and of nickel flakes in order to impart the highest possible conductivity to the active mass by bringing closer together the metal surfaces and the hydroxide surfaces. This very high pressure decreases the porosity of the electrode. An insufficient porosity has the effect either of decreasing the amount of active material electrochemically working, or of decreasing the rate of the electrochemical reactions of discharge.

An intermediate solution which fulfills at the same time the two contradictory conditions must therefore be found. The pressure is given a median value so that the active mass be acceptable both as to its conductivity and as to its porosity.

According to a second known conventional process, natural graphite flakes and nickel hydroxide are intimately mixed by special rolling and milling processes. Pockets which are box-like in form and made of finely perforated nickel-plated steel, are filled with this mixture. Said pockets are assembled, thus constituting electrodes of the so-called pocket type.

The active mass thus obtained is substantially more conductive than the mass obtained by the first-mentioned process. However, this process presents another unavoidable drawback. Although the grades of graphite used withstand oxidation particularly well, such oxidation nevertheless takes place due to anodic polarization occurring during charging. Such oxidation proceeds progressively as the storage cell is used until the surface of the graphite which is in contact with the nickel hydroxide becomes completely oxidized, such oxidation being all the deeper as the temperature of the electrolyte is higher. The electrode then ceases operating satisfactorily. The number of charge and discharge cycles resulting with such an electrode becomes limited and it is about 1000 in the best cases.

Moreover, such oxidation of the graphite causes carbon dioxide to be formed, which carbon dioxide combines with the potassium hydroxide of the electrolyte, thus giving potassium carbonate which is very harmful. In consequence, the electrolyte must be changed very frequently.

A principal object of the present invention is an improved process according to which the positive active material, e.g., nickel hydroxide, or mixtures of nickel hydroxide and cobalt hydroxide constituting the positive electrode of an alkaline storage cell is made conductive.

Said process essentially consists in mixing an anisotropic metal powder, e.g., nickel, possessing special characteristics, with nickel hydroxide, or mixtures of nickel hydroxide and cobalt hydroxide in such a way that the said anisotropic metal powder, e.g. nickel powder, although keeping its own characteristics penetrates into the otherwise non-conductive hydroxide mass, thus producing a conductive active positive material.

Another object of the invention, as a new industrial product, is the positive active material for alkaline electric storage cell positive electrodes obtained by the above-mentioned process.

Still other objects of the invention are the positive electrodes and alkaline accumulators manufactured with such positive active materials.

Other objects, features and characteristics of the invention will become apparent from the following specification and the accompanying drawing forming a part thereof, wherein:

FIGURE 2 is a partially broken away elevation of a tubular electrode containing the conductive active material of this invention;

FIGURE 4 is a sectional view of an electrode comprising a metallic grid carrier or support with the conductive active material of this invention applied thereon;

FIGURE 5 is a sectional view of an electrode comprising an unperforated metal sheet bearing the conductive active material of this invention;

FIGURE 6 is a sectional view of an electrode comprising insulating material with the conductive active material applied thereon, and a conductive current collector; and FIGURE 7 is a diagrammatic view of an alkaline cell or accumulator utilizing positive electrodes of this invention.

It has already been proposed to mix ordinary nickel powder with the active material of an alkaline storage cell. Such a process is described in the French Patent No. 1,011,115 in which the active mass is made conductive by directly mixing it with a conductive material such as nickel, cobalt, etc.

A process of mixing active material with another conductive material is also disclosed in the French Patent No. 1,007,842. Said process is essentially characterized in that the mixture is submitted to a milling process during a short time and then to a rolling process.

Figure 1:
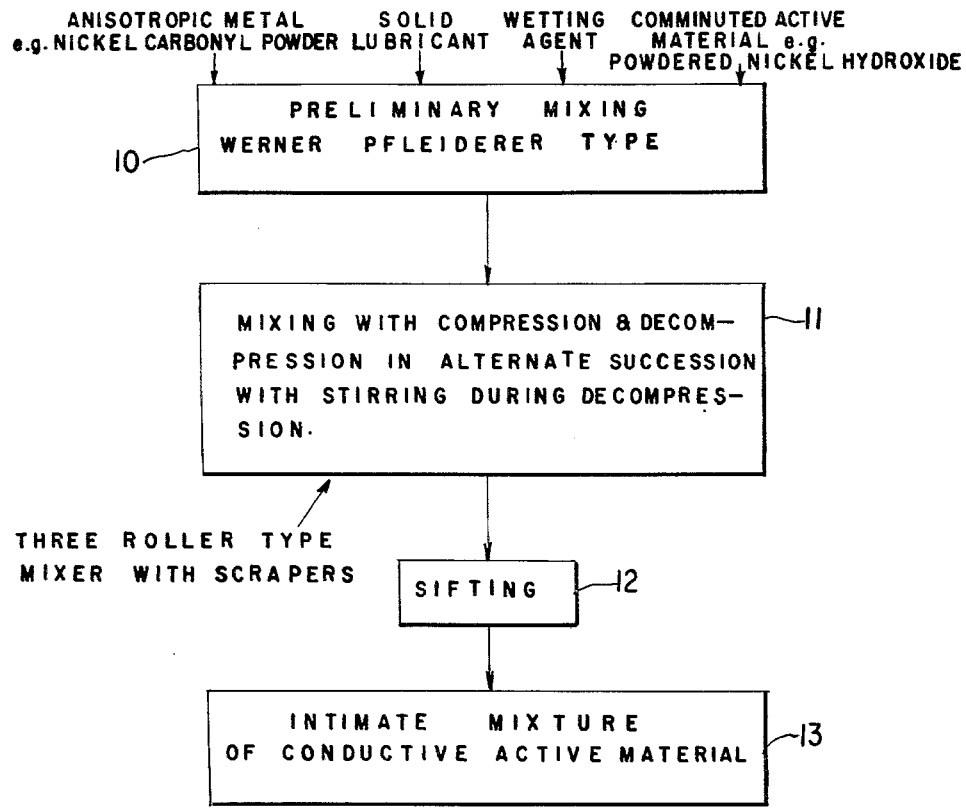
FIGURE 1 is a flow diagram of the process of preparing the conductive active material according to this invention.

Referring now to the drawings and first to FIGURE 1, the process according to the present invention is more especially notable in that it consists in mixing the nonconductive positive active material comminuted to the state of a powder, with an anisotropic metal powder having interlaced particles in the shape of strings or threads.

According to a characteristic of the present invention, the mixing of the two above-mentioned powders is made in such a way that the structure of the anisotropic metal powder particles is practically wholly preserved in the mixture obtained.

Such metal powders, of an anisotropic texture, have the interesting property of possessing a higher conductivity than they would have if they were made with identical particles having a random distribution. In this way, the proportion of the amount of metal, as related to the amount of active material may be substantially lowered though giving the required conductivity to the mass. The only condition to fulfill is that the original particle structure of the anisotropic metal powder, e.g., nickel powder be preserved in a large measure.

According to another characteristic of the present invention, the mixing is made by alternate successions of compression and decompression, each during a short period, so that the hard anisotropic metal particles gradually penetrate the mass of positive active material which is softer.

According to still another characteristic of the present invention, during the decompression periods the mix mass is subjected to a stirring operation.

According to an embodiment, the active material being nickel hydroxide, the conductive anisotropic powder is constituted by nickel derived from nickel carbonyl.

As is well known, nickel carbonyl particles have the fibrous shape of strings or threads.

Thus, the hard anisotropic metal powder particles are inserted into the mass of comminuted active material and mixed therewith with the consequence that the two constituents of the mixture gradually interpenetrate each other. As a consequence of such insertion, the fibrous structure of the hard metal anisotropic metal powder, e.g., nickel powder, due to its string-like nature, can be preserved. This is due to the fact that the compression during rolling is applied only during a short period so that the strings or threads made of nickel particles are in a way kept in the same configuration by being inserted into the hydroxide. During decompression, the mixture is advantageously submitted to a stirring operation. By this succession of operations the two constituents are very intimately mixed, while the fibrous or thread or string-like structure of nickel particles derived from nickel carbonyl is preserved. The interlacing of strings which is thus obtained is particularly suitable for realizing a highly conductive mixture while using only a relatively moderate amount of conductive material. As an example, very good results are obtained by using from about 10 to 30% and preferably from 11 to 16% by weight of nickel powder derived from nickel carbonyl. Such results with such a small amount of conductive material could not be obtained if said material had an isotropic distribution. The random distribution of such particles could not create a continuous conductive network. In order to obtain this, it would be necessary to use a much higher percentage of conductive material, which would be more than 60% by weight of the amount of active material.

It is particularly advantageous to use nickel powders obtained by thermal decomposition of nickel carbonyl. Such powders should be very light, possessing an apparent density lower than 1 and preferably lower than 0.5, because such powders have a large surface area, hence a high covering property. However, satisfactory results have also been obtained by using, according to the invention, anisotropic powders, the apparent density of which is in the range of from 1 to 2.

In order to improve the contact between the positive comminuted positive active hydroxide material and the anisotropic metal powder, e.g., nickel powder, and more especially to promote the mixing without destroying the structure of the nickel powder, it is advantageous to incorporate either a lubricating product in the solid state or any wetting product or agent, or eventually both.

According to a characteristic of the invention, the mixture can be lubricated by adding to the hydroxide-metal powder mixture a low proportion of graphite, preferably having flake form. Said proportion should not be above, e.g., 5% in weight of the mixture. In this way, it is possible to keep the thread-like fibrous structure of nickel particles during the mixing process; the small amount of graphite thus introduced, however, does not have the drawback that was found with graphite when it was previously used, i.e., when it was used in large amounts (about 20%) and constituted alone the conductive network of the electrode.

The nickel powder is wetted with much difficulty. According to the invention, this drawback can be avoided by adding to the hydroxide-metal powder mixture a wetting agent. It may be noted that very good results have been obtained with a suitable wetting material in a very small amount. It is obvious that any wetting material or agent may be used, provided that it does not alter the active material. For this purpose the wetting agent should preferably be neutral. For example, it may be Nekanil, a commercial wetting agent which is a reaction product of the addition of ethylene oxide to fatty alcohols. It is used in a concentration of about 6 ml. of "Nekanil" per liter of water. To 100 kg. of the powder mixture is added 1.5 l. of such solution corresponding to 9 ml. of "Nekanil."

As to the mixing of hydroxide with nickel powder, it must be made with suitable care to avoid destroying the strings and threads of nickel or similar anisotropic metal. To this end, preferably the mixing is effected in two successive stages. For the first stage, preferably a mixer 10 of the Werner Pfleiderer type is used. For the second stage, a three-roller mixer 11 may be successively used, the latter being specially adapted to provide successive compression and decompression periods of the mix of short duration and preferably of a resilient kind. The compression of the mix is effected by its passage between the resiliently mounted rollers; the decompression occurs as the mix passes out from between the rollers. The alternate compression and decompression periods each last about 3–5 seconds. The total mixing period is about 15 minutes.

The mixture adhered on the surfaces of the mixer rollers is compressed when it passes between pairs of the rollers of mixer 11 and is decompressed as soon as it leaves those compression zones. Then, scrapers (not shown) may be applied to the surfaces of the rollers to remove the mix therefrom and thus cause a stirring of the mass.

According to a characteristic of the invention, the resultant or mix of two components, non-conductive positive active material and anisotropic metal powder, is sifted in order to remove the finer parts, e.g., through a No. 100 sieve 12.

According to the invention, a conductive positive active material 13 is obtained by such process which is suitable for manufacturing pocket-type electrodes, as well as tubular electrodes, or electrodes in which the active material is pasted or adhered otherwise on a support or carrier.

This mass has the following advantages.

Figure 3:
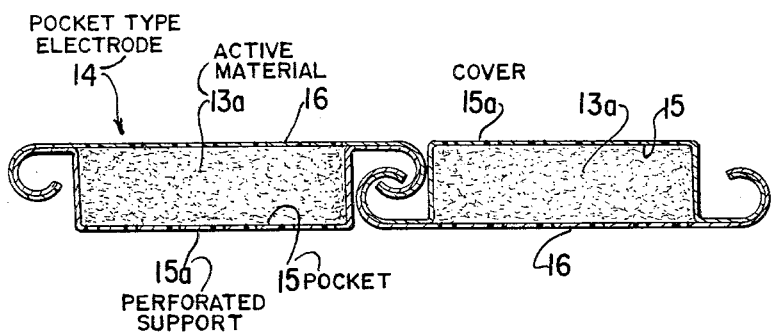
FIGURE 3 is a sectional view of a pocket-type electrode containing the conductive active material of this invention.

For the pocket-type electrodes 14 (FIGURE 3):

The resulting conductive positive active material mix 13a derived by the process of this invention is deposited in assembled individual pockets 15 of perforated conductive supports or carriers 15a, each having a cover 16 in known ways. This material 13a has a conductivity which remains steady and practically constant throughout the time during charging and discharging cycling which is not the case of highly graphited masses, the graphite of which, however chemically resistant, is finally oxidized and, as a result, decreases the life of the whole electrode, by gradual destruction of the conductive network, which is caused by a decrease of the contact between the hydroxide and the graphite.

The life of storage cells with pocket-type electrodes 14 utilizing the positive active material 13a derived from the process of this invention is thus increased and reaches more than twice that of the cells with heavily graphited active mass which is not practically longer than three years of normal use, such use being of about 300 cycles a year.

As to the tubular electrodes 17 (FIGURE 2):

The tubular electrodes 17 are manufactured by mild compression of the positive active material 13b prepared according to the process of this invention, into conductive helically wound porous metal tubes or supports 18 without any addition of nickel flakes. Such electrodes 17 show substantially improved properties as compared with tubular electrodes prepared by the conventional aforesaid processes. Such improvements are more especially found in a saving of nickel hydroxide and a higher efficiency of the positive active material, so that an overall efficiency gain of about 30% is obtained.

Moreover, the manufacture of such tubular electrodes 17 is made easier since the number of piled-up and compressed layers of positive active material 13b may be reduced without disadvantage.

It is well understood that the process for manufacturing active material which has been described is not solely limited to use with nickel hydroxide. It may advantageously be applied to use with any other active material, such as a mixture of nickel hydroxide and cobalt hydroxide, or to manganese dioxide for primary batteries, or to negative active material, e.g., cadmium hydroxide, etc.

With the following table, it is possible to compare the capacities obtained, and the amounts of nickel hydroxide used in the cells, the positive electrodes of which have been manufactured according to the conventional processes and with cells containing electrodes according to this invention:

|  | Conventional cells | | Cell with positive plates according to the invention |
|---|---|---|---|
|  | Edison | Applicant's Assignee |  |
| Capacity after a long charge in amp. hrs. | 282 | 290 | 320. |
| Amount of nickel hydroxide used. | 1,620 g | 1,725 g | 1,379 g. |
| Theoretical capacity in amp. hr. | 460 | 500 | 400. |
| Efficiency | 60% | 58% | 80%. |

Electrodes 19, 20 and 21 of the third type (FIGURES 4, 5 and 6) considered in this invention are characterized in that the positive active material prepared according to the process of this invention is no longer contained in a metal envelope with finely perforated walls, but, on the contrary, is directly exposed to the electrochemical exchanges, being kept in its place by separators. To this end, a suspension of the active material derived according to the process of this invention, is prepared in a viscous medium such as the medium obtained by the dissolution in water of some organic products with long or reticulated chains. It is advantageous to use for this purpose cellulosic compounds such as the salts of carboxy-methylcellulose. The positive active material 13c, 13d or 13e thus suspended is pasted or applied, and if necessary, compressed on a suitable metal carrier or support (grid or metal fibers 22 felted or not, FIGURE 4), metal sheets 23 (FIGURE 5 perforated or not, etc. . . .), or on a suitable insulating material 24 (FIGURE 6) which may be used as a separator.

In the latter case, a conductive body 25 is placed in the positive active material, such conductive body being used as current collector and being similar to what has been hereabove described as a carrier. By piling up the positive electrodes 14, 19, 20 or 21 thus manufactured and, if necessary, providing porous capillary separation, blocks of electrodes and separators are obtained which in a cell are maintained in a more or less tightly pressed state in known ways.

The positive electrodes 14, 17, 19, 20 or 21 manufactured according to the invention with separators S between if needed, are more especially suitable for use in some types of gas-tight storage cells C where it is an advantage to have finely divided nickel distributed on the surface of each particle of active material, in order to increase the rate of secondary electrochemical reactions by which the electrolysis products evolved at the end of charge or during overcharge are recombined. The cell C, of course, includes negative electrodes 26 of conventional type and an alkaline electrolyte such as potassium hydroxide all located preferably in a suitable casing 27 that may, if desired, be sealed. The assembly of electrodes and separators may be maintained in compressed condition in known ways, if desired.

While specific embodiments of the invention have been disclosed, variations within the scope of the appended claims are possible and are contemplated. There is no intention, therefore, of limitation to the exact disclosure herein made.

What is claimed is:

1. A process for manufacturing conductive positive electrode active materials for alkaline electric storage cells comprising preparing a mix by mixing a mass of non-conductive active material selected from the group consisting of nickel hydroxide and mixtures of nickel hydroxide and cobalt hydroxide, comminuted to powdered state with a mass of an anisotropic hard metal powder whose particles have the structure of interlacing strings and threads and a density ranging from below 0.5 to approximately 2 so as to preserve the structure of the metal powder in the mix by subjecting the mix to alternate successions of periods of compression and decompression so that the hard anisotropic metal particles gradually penetrate the mass of non-conductive active material which is softer.

2. The process according to claim 1, wherein stirring of the mix is effected during the periods of decompression.

3. A process for manufacturing conductive positive electrode active materials for alkaline electric storage cells comprising preparing a mix by mixing a mass of non-conductive positive active material selected from the group consisting of nickel hydroxide and mixtures of nickel hydroxide and cobalt hydroxide comminuted to powdered state with a mass of an anisotropic hard nickel powder whose particles have the structure of interlacing strings and threads so as to preserve the structure of the nickel powder in the mix, said mixing being effected by subjecting the mix to a mixing step comprising alternate successions of periods of compression and decompression so that the hard nickel particles gradually penetrate the mass of non-conductive positive active material which is softer, stirring the mix during periods of decompression and sifting the mix to remove finer particles therefrom and which are capable of passing through a 100 mesh screen.

4. The process of claim 3 wherein the anisotropic nickel powder is nickel derived from nickel carbonyl.

5. The process of claim 4 wherein said nickel has an apparent density ranging from below 0.5 to approximately 2.

6. The process of claim 3 wherein a solid lubricant is added to the mix.

7. The process of claim 6 wherein the solid lubricant is graphite in the proportion of approximately 5% by weight of the mix.

8. The process of claim 3 wherein a wetting agent is added to the mix.

9. The process of claim 3 wherein a solid lubricant and a wetting agent are added to the mix.

10. The process of claim 3 wherein the anisotropic nickel powder of the mix is in the proportion ranging from 10–30% by weight of the mix.

11. The process of claim 3 wherein the anisotropic nickel powder of the mix is in the proportion ranging from 11 to 16% by weight of the mix.

12. The process of claim 3 wherein the compression period of the mix is effected by passing the mix between resiliently disposed rotating rollers which resiliently compress the mass of the mix during its passage between the rollers while the decompression period occurs when the mass of the mix passes outwardly from between the rollers.

13. The process of claim 3 wherein the mixing includes two stages, the first stage comprising subjecting the mass of the mixture to mixing in a Werner Pfleiderer type mixer and the second stage comprising subjection of the mix product of the first stage to mixing in a three-roller type mixer wherein said alternate succession of periods of compression and decompression are effected by passage of the mix product of the first stage in and out between the rollers of said last-named mixer.

14. In an alkaline storage cell, a conductive, active, positive material consisting essentially of an intimate mixture of non-conductive powdered active material selected from the group consisting of nickel hydroxide and mixtures of nickel hydroxide and cobalt hydroxide and an anisotropic metal powder of interlaced fibrous particles having the shape of strings or threads.

15. In an alkaline storage cell, a conductive, active, positive material consisting essentially of an intimate mixture of non-conductive powdered active material selected from the group consisting of nickel hydroxide and mixtures of nickel hydroxide and cobalt hydroxide and an anisotropic nickel powder of interlaced fibrous practicles having the shape of strings or threads in the proportion of 10 to 30% by weight of the mixture.

16. In an alkaline storage cell, a conductive, active, positive material consisting essentially of an intimate mixture of non-conductive powdered active material, selected from the group consisting of nickel hydroxide and mixtures of nickel hydroxide and cobalt hydroxide, an anisotropic nickel powder of interlaced fibrous particles having the shape of strings or threads and a lubricant with the anisotropic powder present in the proportion of about 10–30% by weight of the mixture and the lubricant present in the proportion of about 5% by weight of the mixture.

17. In an alkaline storage cell, a conductive, active, positive material consisting essentially of an intimate mixture of a non-conductive powdered active material, selected from the group consisting of nickel hydroxide and mixtures of nickel hydroxide and cobalt hydroxide, an anisotropic metal powder, of interlaced fibrous particles having the shape of strings or threads, a lubricant and a wetting agent.

18. In an alkaline storage cell, a conductive, active, positive material according to claim 17 wherein said anisotropic metal powder is nickel derived from nickel carbonyl and said lubricant is graphite in flake form.

19. In an alkaline storage cell a conductive, active, positive material consisting essentially of an initimate mixture of positive non-conductive powdered active material selected from the group consisting of nickel hydroxide and mixtures of nickel hydroxide and cobalt hydroxide and an anisotropic metal powder of interlaced fibrous particles having the shape of strings or threads, and a support for said initimate mixture.

20. In an alkaline storage cell, a conductive, active positive material consisting essentially of an intimate mixture of positive, non-conductive, powdered, active material selected from the group consisting of nickel hydroxide and mixtures of nickel hydroxide and cobalt hydroxide and an anisotropic metal powder of interlaced fibrous particles having the shape of strings or threads, and a support for said intimate mixture and wherein said anisotropic metal powder is nickel derived from nickel carbonyl.

21. An alkaline electric storage cell including positive and negative electrodes and alkaline electrolyte and wherein the positive electrode comprises a support and an intimate mixture consisting essentially of positive, non-conductive powdered active material selected from the group consisting of nickel hydroxide and mixtures of nickel hydroxide and cobalt hydroxide and an anisotropic metal powder of interlaced fibrous particles having the shape of strings or threads maintained by the said support.

22. A process for manufacturing an active conductive electrode material for an electric cell comprising the steps of preparing a mix by mixing a mass of non-conductive active material selected from the group consisting of nickel hydroxide and mixtures of nickel hydroxide and cobalt hydroxide, and cadmium hydroxide comminuted to powdered state with a mass of anisotropic hard metal powder whose particles have the structure of interlacing strings and threads and a density ranging from below 0.5 to 2 by subjecting the mix to alternating successions of periods of compression and decompression so that the structure of the hard anisotropic metal particles is preserved and the hard anisotropic metal particles gradually penetrate the mass of non-conductive active material which is softer.

References Cited by the Examiner

UNITED STATES PATENTS

| 2,001,134 | 5/1935 | Hardy | 75—1 |
| 2,794,735 | 6/1957 | Schlecht | 75—213 |
| 3,009,980 | 11/1961 | Corren et al. | 136—28 |
| 3,108,910 | 10/1963 | Herold | 136—29 |

FOREIGN PATENTS

| 456,948 | 5/1949 | Canada. |
| 780,481 | 8/1957 | Great Britain. |
| 784,598 | 10/1957 | Great Britain. |

WINSTON A. DOUGLAS, *Primary Examiner.*

MURRAY TILLMAN, JOHN H. MACK, *Examiners.*